Patented Aug. 11, 1931

1,818,615

UNITED STATES PATENT OFFICE

WILHELM GLUUD, OF DORTMUND-EVING, GERMANY

PROCESS OF ELIMINATING SULPHURETTED HYDROGEN FROM GASES

No Drawing. Application filed August 7, 1928, Serial No. 298,136, and in Germany August 16, 1927.

This invention relates to a process of producing any sort of gases such as hydrogen, mixtures of hydrogen and nitrogen, coal gases and so forth adapted for synthetic purposes and which have been carefully purified from such substances which may disturb the subsequent catalytic conversion. It has become known that carbon monoxide and sulphuretted hydrogen have a poisonous effect on catalysts. It is therefore necessary to carefully remove the same from the gas mixture prior to the further utilization of the gas. By means of the present invention it is possible to liberate, in a technically simple and economic manner, both substances from the gas mixture in two successive operations. A very simple method for removing the carbon monoxide has become known in which the catalytic conversion of the same into methane is effected by conducting the gas mixture over nickel at about 300° C. It has been found that, according to this working method, even if only small quantities of carbon monoxide are present, these are removed up to the last traces. In view of this reaction as well as in view of the further utilization of the gas mixture for synthetic purposes, it is necessary to first remove as completely as possible the sulphuretted hydrogen from the gas. Methods have become known according to which it is possible to free the gas mixture of the sulphur by conducting it over purifying masses, for instance ferrous hydroxide or oxide. In all these known processes it was necessary to previously cool the gas mixture before the method could be carried out. It has been found that if the gas freed of the sulphur has to be subsequently worked immediately at increased temperature, so that consequently a reheating has to follow directly after the cooling, the economy of the method might be endangered. It has further been found that the removing of the sulphuretted hydrogen from moist gases may be carried out with masses of iron oxides or hydroxides at temperatures above 100° C., provided on the one hand the temperature in the purifier is maintained so high that no steam condenses, and that on the other hand during the purifying of reducing acting gases the temperature does not increase to such a degree that a reduction of the oxide masses occurs. A temperature of 150 to 300° C. has proved to be the most suitable working temperature. The desulphurating effect of the purifying masses may be still further increased by admixing suitable catalysts for instance by alkalization of the material, such as is known for example when using artificial masses originating from the alumina manufacturing.

The removing of the sulphuretted hydrogen at increased temperature presents the further advantage that the reaction speed is considerably increased in comparison with the purification at normal temperature. It is consequently possible to work at high gas speed and therefore with much smaller purifying apparatus. It is consequently still possible to carry out in an economic manner the removing of the sulphuretted hydrogen from gases which are under high pressure. The purifying mass may be applied in powder form as well as in the form of compressed masses with or without mastic.

Example

A mixture of carbon monoxide and hydrogen is passed, at a speed of about 10 cubic meters per hour, and at temperatures of 150° to 300° C. over about 10 liters of briquetted or moulded iron oxides, for instance lux mass for removing the sulphuretted hydrogen; these iron oxides are accommodated in a vessel which is heat-insulated or provided with heat exchangers or may be heatable. The gas thus freed from sulphuretted hydrogen is then passed over a nickel contact for converting the carbon monoxide with the hydrogen into methane. The gas purified of the catalyst poisons in this manner can then be used for various purposes, for example for the production of ammonia, and any synthetic purposes. The heat discharged from the purifying apparatus directly or through heat exchangers can be further utilized.

By the present invention it has become possible to obtain a very useful method for removing sulphuretted hydrogen from gases at elevated temperature which may be of special use if a subsequent removal of carbon monoxide is necessary because it is not necessary to cool the gas between the two operations.

I claim:—

1. A process for eliminating sulphuretted hydrogen from hot gases, consisting in cooling the gases only to 150 to 300° C., and in passing said gases over alkalized hydrated iron oxide masses at this temperature.

2. A process for eliminating sulphuretted hydrogen from hot gases, consisting in passing the gases under pressure at a temperature between 150 and 300° C. over alkalized hydrated iron oxide masses.

In testimony whereof I affix my signature.

WILHELM GLUUD.